Figure 1:
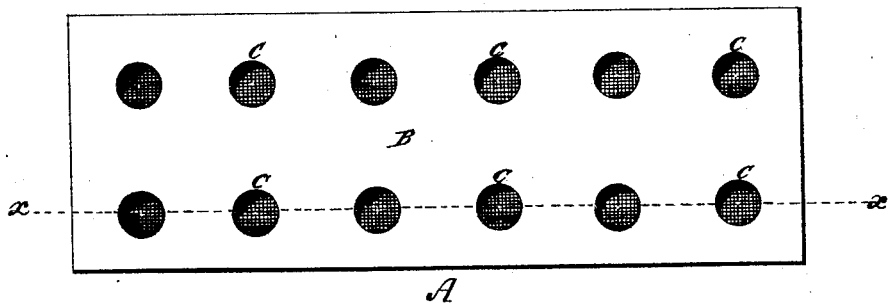

BRIGHT & MOREY.

Plastic Composition.

No. 61,045.

Patented Jan. 8, 1867.

Witnesses:
F. A. Jackson
Wm Truran

Inventor:
W. S. Bright
J. G. Morey
Per Munn & Co
Attorneys

United States Patent Office.

W. S. BRIGHT AND J. G. MOREY, OF NEW ORLEANS, LOUISIANA.

Letters Patent No. 61,045, dated January 8, 1867.

IMPROVED MEDICATED PLASTER.

*The Schedule referred to in these Letters Patent and making part of the same.*

TO ALL WHOM IT MAY CONCERN:

Be it known that we, W. S. BRIGHT and J. G. MOREY, of New Orleans, parish of Orleans, and State of Louisiana, have invented a new and useful Improved Medicated Plaster; and we do hereby declare that the following is a full, clear, and exact description thereof, which will enable others skilled in the art to make and use the same, reference being had to the accompanying drawing, forming a part of this specification.

The present invention relates to a plaster made of a perforated sheet of buckskin, white leather, kid or goat skin, cloth, flannel, felt, India rubber, or any other soft or pliable material, which sheet is perforated with one or more openings at suitable points, and covered or coated upon one side and around the said openings with a medicated compound formed of the following ingredients, mixed together in and about the proportions hereinafter stated, viz: two ounces gum ammoniacum, four ounces isinglass, one quart diluted acetic acid.

The acetic acid and ammoniacum are boiled for about one hour, when, having strained it, the isinglass is then added; after which the mixture is boiled slowly until the isinglass has become perfectly dissolved, which is then, after having become sufficiently cooled, applied with a brush, or by any other suitable means, to one side of the said muslin, silk, or other substance or material of which the plaster is made.

The medicated plaster hereinabove described is intended more especially for the relief and cure of corns, and in its use, if the plaster-sheet is made with a series of perforations or openings, as, for instance, twelve, it (the sheet) is first cut about either one or more of its openings, according as may be required, into a square, round, or other suitable shape, a little larger than the said openings. The corn is then pared or dressed to receive the plaster, when, moistening the glazed or medicated surface of the plaster-section cut, as above explained, with the tongue, or in any other suitable manner, apply it to and about the corn, being careful, however, to place the opening in the buckskin or other material of which the plaster sheet is composed above and over the centre of the corn, and so as to come next to the stocking, which is worn upon the foot.

It is desirable that the plaster applied to a corn as above explained should not be removed for a week, or as long as it can be worn with ease; and if the corn is not removed by the first application, apply others, until a permanent cure is effected, the object of the opening in the plaster being to protect the corn from the pressure of the foot or shoe worn upon the foot.

Figure 2:

In the accompanying plate of drawings one form of plaster, made according to the present invention, is illustrated, Figure 1 being a view of the side of the plaster which is not covered with the medical compound; and Figure 2, a cross-section, taken in the plane of the line $x\, x$, fig. 1.

Similar letters of reference indicate like parts.

A, in the drawings, represents the plaster-sheet, which, in the present instance, is composed of a sheet of buckskin, B, perforated at suitable points, C, and covered upon one side, extending over and across its said openings C, with a sheet of cloth or linen D, that is coated or covered with the medicated compound formed of the ingredients, and mixed together in and about, and in the manner hereinbefore explained.

We claim as new, and desire to secure by Letters Patent—

A medicated plaster, made and coated with a medicated compound, formed of the ingredients mixed together in and about the proportions named, substantially as and for the purpose described.

The above specification of our invention signed by us this twenty-fifth day of July, 1866.

W. S. BRIGHT,
J. G. MOREY.

Witnesses:
W. R. BRIGHT,
E. FAYERWEATHER.